United States Patent [19]

Chen

[11] Patent Number: 5,421,605
[45] Date of Patent: Jun. 6, 1995

[54] LUGGAGE CARRIER

[76] Inventor: Chin-Tsai Chen, IF, 125-6, Sec. 1, San Min Rd., Taichung, Taiwan, Prov. of China

[21] Appl. No.: 268,966

[22] Filed: Jun. 30, 1994

[51] Int. Cl.[6] .............................................. B62B 1/12
[52] U.S. Cl. .................................. 280/655; 280/47.29
[58] Field of Search ............... 280/639, 651, 652, 655, 280/655.1, 47.24, 47.26, 47.27, 47.29, 47.371

[56] References Cited

U.S. PATENT DOCUMENTS

| | | | |
|---|---|---|---|
| 3,998,476 | 12/1976 | Kazmark, Sr. | 280/655 |
| 4,591,183 | 5/1986 | Gordon et al. | 280/655 |
| 4,974,871 | 12/1990 | Mao | 280/655 X |
| 5,178,404 | 1/1993 | Chen | 280/655 |

*Primary Examiner*—Margaret A. Focarino
*Assistant Examiner*—Michael Mar

[57] ABSTRACT

A luggage carrier comprises a fastening plate located at the junction of a primary tube and a secondary tube of each of two telescoping frames. The fastening plate is provided with a receiving space in communication with a primary tube fitting hole. The receiving space is provided centrally with a rotatable button pivoted thereto and provided respectively at both sides thereof with an arresting element having a locating rod dimensioned to fit into a through hole of a stopping piece. Each of two locating rods is fitted into a compression spring and is received in the through hole of the primary tube and the locating hole of the secondary tube. An actuating cord wound on the rotatable button is capable of causing the locating rod of the arresting element to disengage from the locating hole of the secondary tube, thereby enabling the secondary tube to be slid inside the primary tube.

1 Claim, 5 Drawing Sheets

LUGGAGE CARRIER

BACKGROUND OF THE INVENTION

The present invention relates to the improved structures of a luggage carrier, which is also known as a baggage carrier.

A luggage carrier is a handy traveling adjunct for a traveler in general and a frequent traveler in particular. A luggage, espcically a heavy luggage, can be easily carried around on a luggage carrier, which is generally composed of two frames, a stand, and two casters. As shown in FIG. 1, a conventional luggage carrier comprises two telescopical frames, each of which has a primary tube into which a secondary tube 12 can be slid. The secondary tube 12 can be located inside the primary tube by means of a rotatable button 11 located at the junction 10 of the primary tube and the secondary tube 12. Such a frame of the luggage carrier as described above is defective in design in that the rotatable button 11 is manually operated and that it is rather inconvenient for a traveler, especially a traveler in a hurry, to adjust the frames of the luggage carrier with hand.

SUMMARY OF THE INVENTION

It is therefore the primary objective of the present invention to provide an improved luggage carrier which overcomes the shortcomings of the prior art luggage carrier described above.

In keeping with the principle of the present invention, the foregoing objective of the present invention is attained by a luggage carrier, which comprises a fastening plate located at the junction of a primary tube and a secondary tube and provided with a receiving space in communication with a primary tube fitting hole. The receiving space is provided centrally with a rotatable button pivoted thereto and is further provided centrally at the top thereof with an arcuate protective plate. The rotatable button is provided respectively at both sides thereof with an arresting element having a locating rod dimensioned to fit into a through hole of a stopping piece which is fastened to the receiving space. Each of two locating rods is fitted into a compression spring and is received in the through hole of the primary tube and the locating hole of the secondary tube. An actuating cord wound on the rotatable button is capable of causing the locating rod of the arresting element to disengage the locating hole of the secondary tube, thereby enabling the secondary tube to be adjustably slid inside the primary tube.

The foregoing objective, features and functions of the present invention will be more readily understood upon a thoughtful deliberation of the following detailed description of the embodiment of the present invention in conjunction with the accompanying drawings.

DETAILED DESCRIPTION OF THE EMBODIMENT

Figure 1:
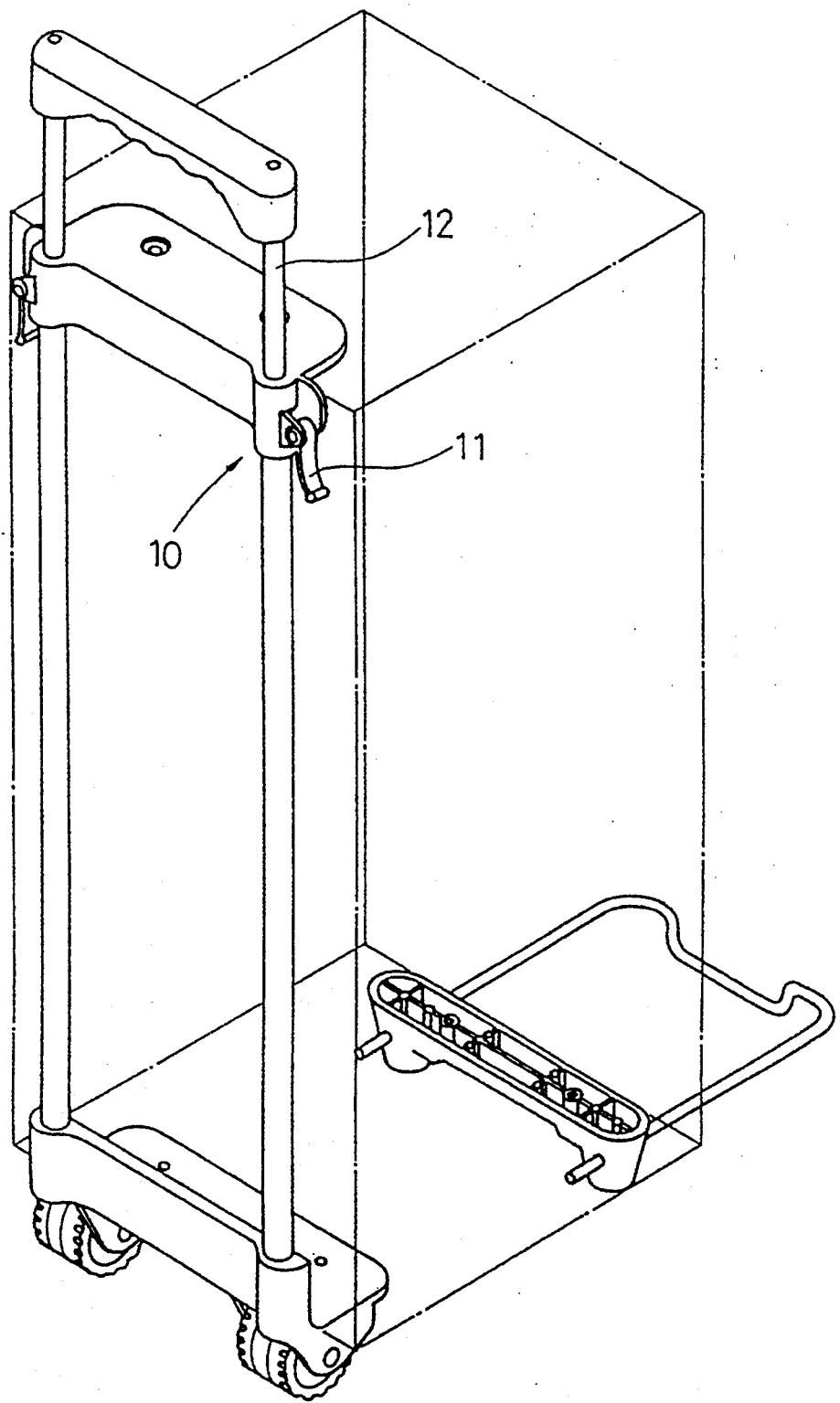
FIG. 1 shows a perspective view of a luggage carrier of the prior art.
Figure 2:
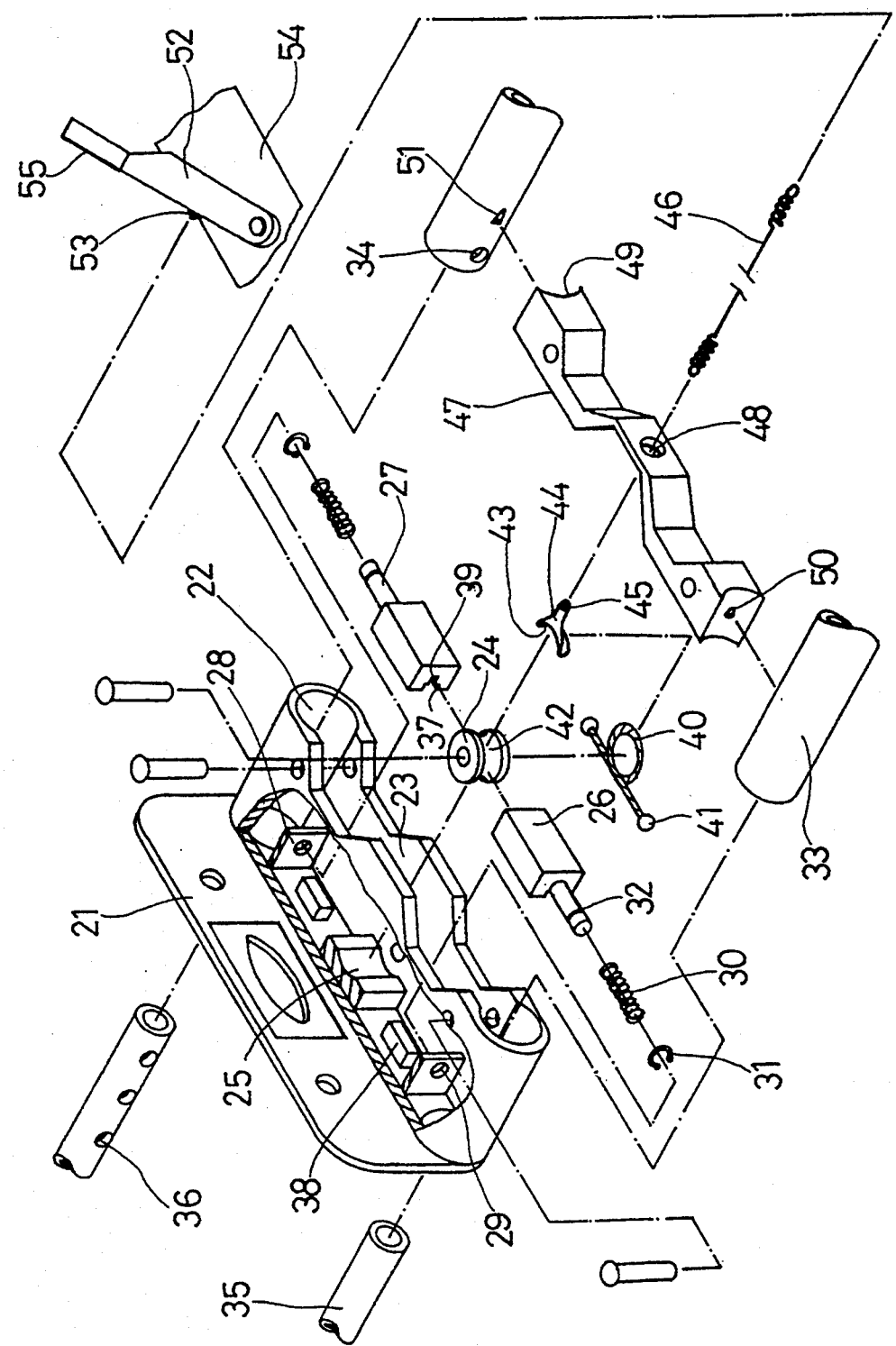
FIG. 2 shows an exploded view of a portion of a luggage carrier of the present invention.
Figure 3:
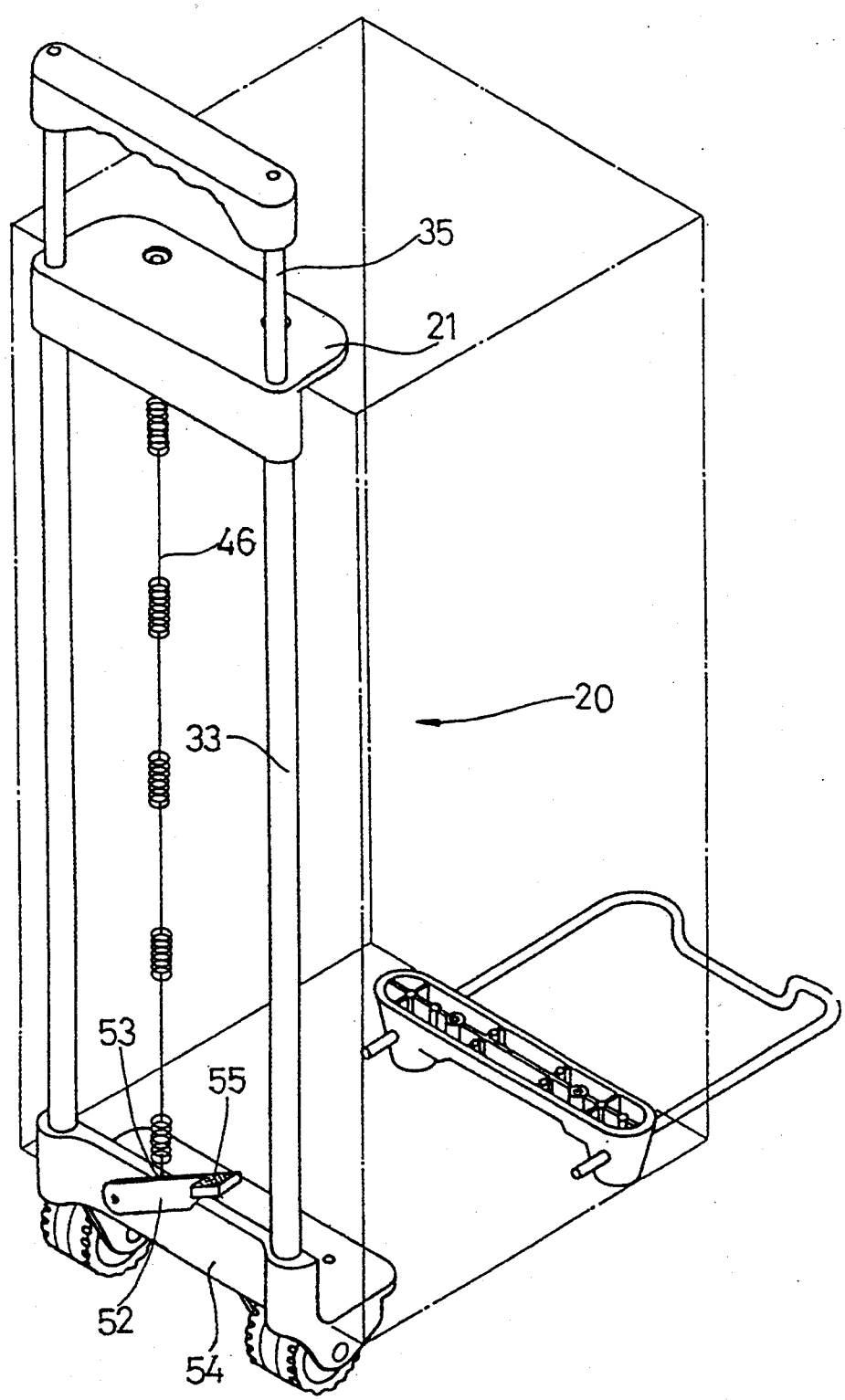
FIG. 3 shows a perspective view of the luggage carrier of the present invention.

As shown in FIGS. 2 and 3, a luggage carrier 20 of the present invention comprises a fastening plate 21 disposed at the junction of a primary tube 33 and a secondary tube 35 and provided downwards a receiving space 23 in communication with a fitting hole 22 of the primary tube 33. The receiving space 23 is provided centrally and pivotally with a rotatable button 24 and is further provided centrally at the top thereof with an arcuate protective plate 25. The rotatable button 24 is provided respectively at both sides thereof with an arresting element 26 having a locating rod 27 which is so dimensioned as to be received in a through hole 29 of a stopping piece 28 fastened to the top of the receiving space 23. Each of the two locating rods 27 is fitted into a compression spring 30 which is located by a C-shaped retainer 31 which is held securely in place in a retaining slot 32 of the locating rod 27. The primary tube 33 is provided with a through hole 34 dimensioned to receive therein the locating rod 27, which is then located in a locating hole 36 of the secondary tube 35. Each arresting element 26 is provided with a slide slot 37 slidable on a slide rail 38 located at the top of the receiving space 23. The slide slot 37 is provided at one end thereof with a receiving hole 39 engageable with a cord head 41 of an actuating cord 40 which is wound in the groove 42 of the rotatable button 24. The actuating cord 40 can be hooked by an arcuate hooking body 43 of a pulling piece 44 which is attached to the groove 42 of the rotatable button 24. The pulling piece 44 is provided at the bottom thereof with a round hole 45 capable of holding a spring connection rod 46 which is integrally composed of a spring and a connection rod which are spaced at an interval. The spring connection rod 46 is put through a central guide hole 48 of an M-shaped covering member 47 which is fastened to the open end of the receiving space 23. The covering member 47 is provided respectively at both ends thereof with a recessed edge 49 having thereon a retaining hook so capable of retaining a locating point 51 of the primary tube 33. The spring connection rod 46 is fastened at another end thereof with an ear hole 53 of a support rod 52 pivoted at one end thereof to a side of a fixing plate 54 of the luggage. The support rod 52 is provided at another end thereof with a pedal 55.

The functions and the advantages of the luggage carrier of the present invention are expounded explicitly hereinafter.

Figure 4:
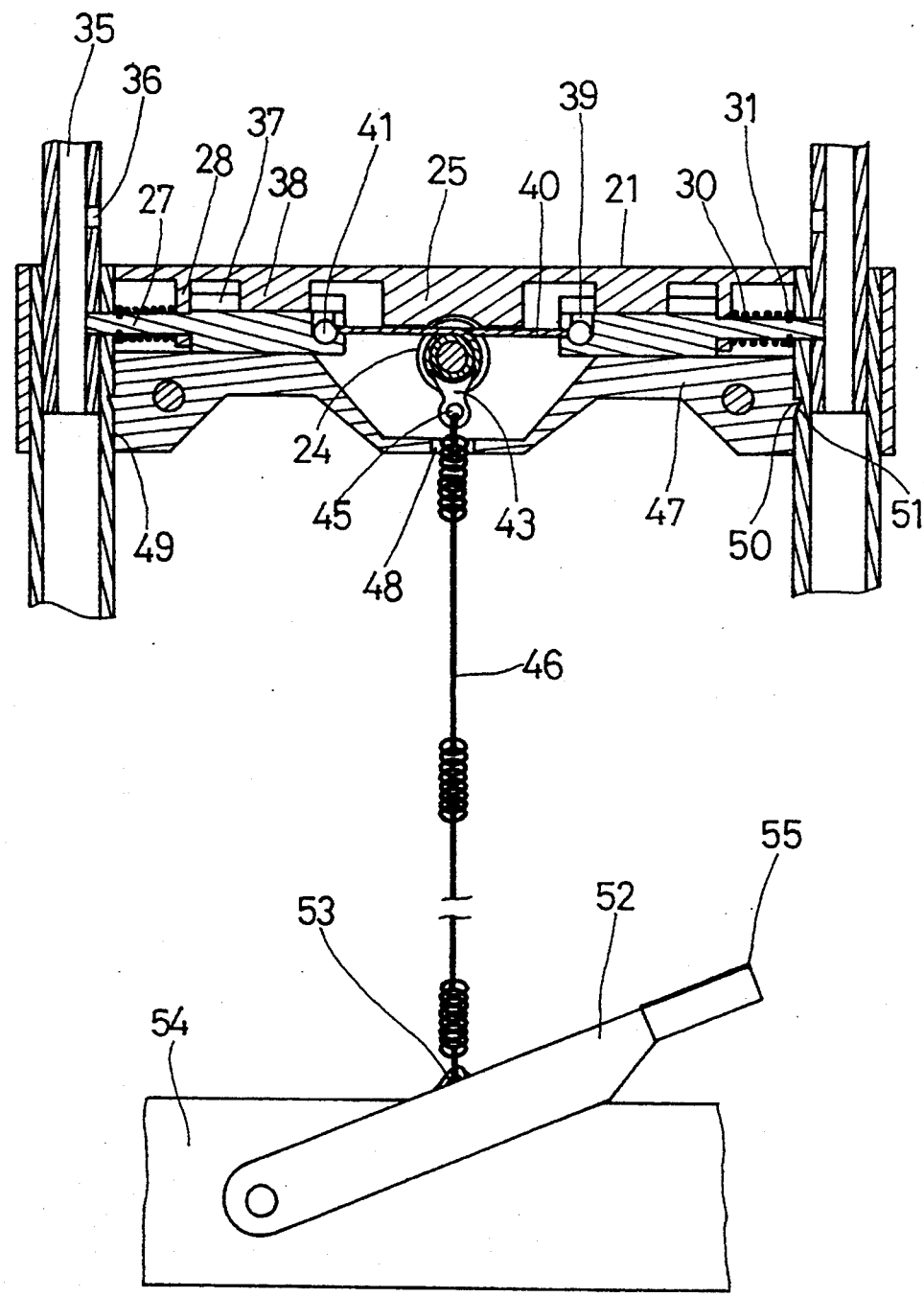
FIG. 4 shows a schematic view of the working of the present invention.
Figure 5:
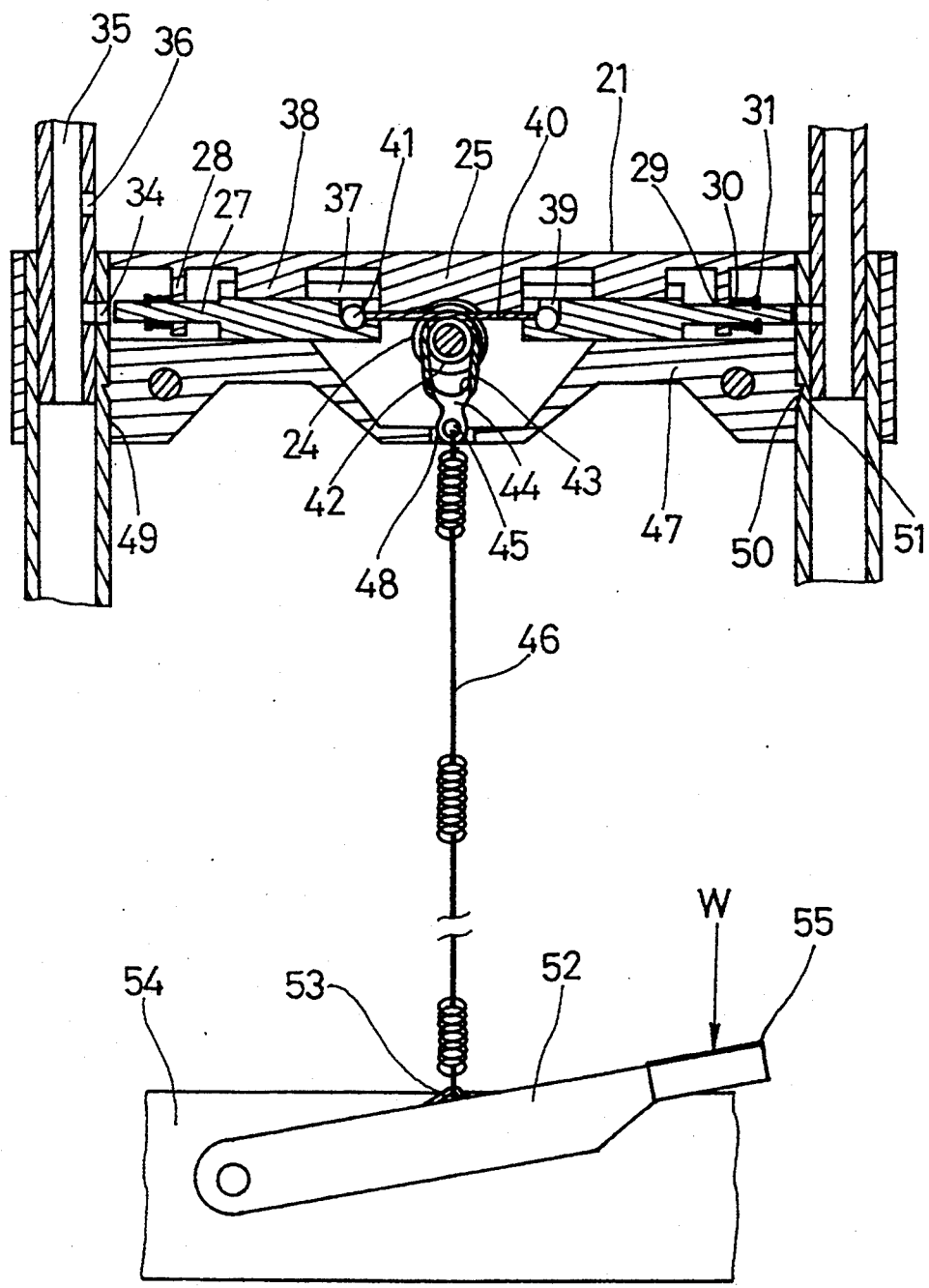
FIG. 5 shows another schematic view of the working of the present invention.

As illustrated in FIGS. 4 and 5, the spring connection rod 46, which is held securely by the ear hole 53 of the support rod 52, is triggered by the pedal 55. In other words, when the pedal 55 is stepped on, the spring connection rod 46 is triggered to actuate the the pulling piece 44, thereby causing the arcuate hooking body 43 of the pulling piece 44 to pull the actuating cord 40 to unwind so that both ends of the actuating cord 40 are guided by the rotatable button 24 to draw horizontally and inwardly such that the two arresting elements 26, which are fastened to the two cord heads 41, are caused to pull back along the slide rails 38. As a result, the locating rod 27 of the arresting element 26 is caused to disengage the locating hole 36 of the secondary tube 35, thereby permitting the secondary tube 35 to be slid inside the primary tube 33. As the pedal 55 is relieved of the pressure exerting thereon, the compression spring 30 which is fitted over the locating rod 27 of the arresting element 26 is retained at one end thereof in the retaining slot 32 by the C-shaped retainer 31, with another end of the compression spring 30 urging the stopping piece 28 of the receiving space 23. As a result, the locating rod 27 of the arresting element 26 is actuated to engage securely the locating hole 36 of the secondary tube 35. The receiving space 23 is provided at the open end thereof with the M-shaped covering member 47 comprising respectively at both ends thereof a recessed edge 49 having a retaining hook 50 which is engageable rapidly with the locating point 51 of the primary tube 33 at the time when the primary tube 33 is fitted into the fitting hole 22 during the process of assembling the luggage carrier of the present invention.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claim.

What is claimed is:

1. A luggage carrier comprising:

two upright telescoping frames, each of which has a primary tube into which a secondary tube can be slid;

a stand fastened at one side thereof with bottom ends of said frames; and two casters mounted rotatably and respectively to said bottom ends of said frames;

wherein said frames are provided with a fastening plate located at a junction of said primary tube and said secondary tube, said fastening plate being provided with a downwardly opening receiving space in communication with a fitting hole for receiving said primary tube, said receiving space being provided with a centrally located rotatable button and further provided with an arcuate protective plate located centrally above said rotatable button, said rotatable button provided respectively at both sides thereof with an arresting element having a locating rod dimensioned to be received in a through hole of a stopping piece fastened within said receiving space, said locating rod being fitted into a compression spring, said spring being secured to said locating rod by means of a C-shaped retainer held securely in a retaining slot of said locating rod, said locating rod being located in a locating hole of said secondary tube via a through hole of said primary tube, said arresting element being provided with a slide slot engageable with a slide rail located within said receiving space and having at one end thereof a receiving hole into which a cord head of an actuating cord is fitted, said actuating cord being wound in a groove of said rotatable button such that said actuating cord can be held by an arcuate hooking body of a pulling piece provided at a lower end thereof with a round hole engageable with one end of a spring connection rod which is formed integrally of a spring and a connection rod which are internally spaced, said spring connection rod being dimensioned to be received within a central guide hole of an M-shaped covering member fastened to an open end of said receiving space, said covering member being provided respectively at both ends thereof with a recessed edge having a retaining hook engageable within a locating recess of said primary tube, said spring connection rod having another end engageable securely with an ear hole of a support rod having one end that is pivoted to a side of a fastening plate located at a lower edge of the luggage carrier, said support rod further having another end that serves as a pedal.

* * * * *